June 4, 1929.  E. P. BULLARD, JR  1,715,896
TOOL SLIDE
Filed June 28, 1926   4 Sheets-Sheet 1

INVENTOR.
Edward P. Bullard, Jr.
BY
ATTORNEYS.
Chamberlain + Newman

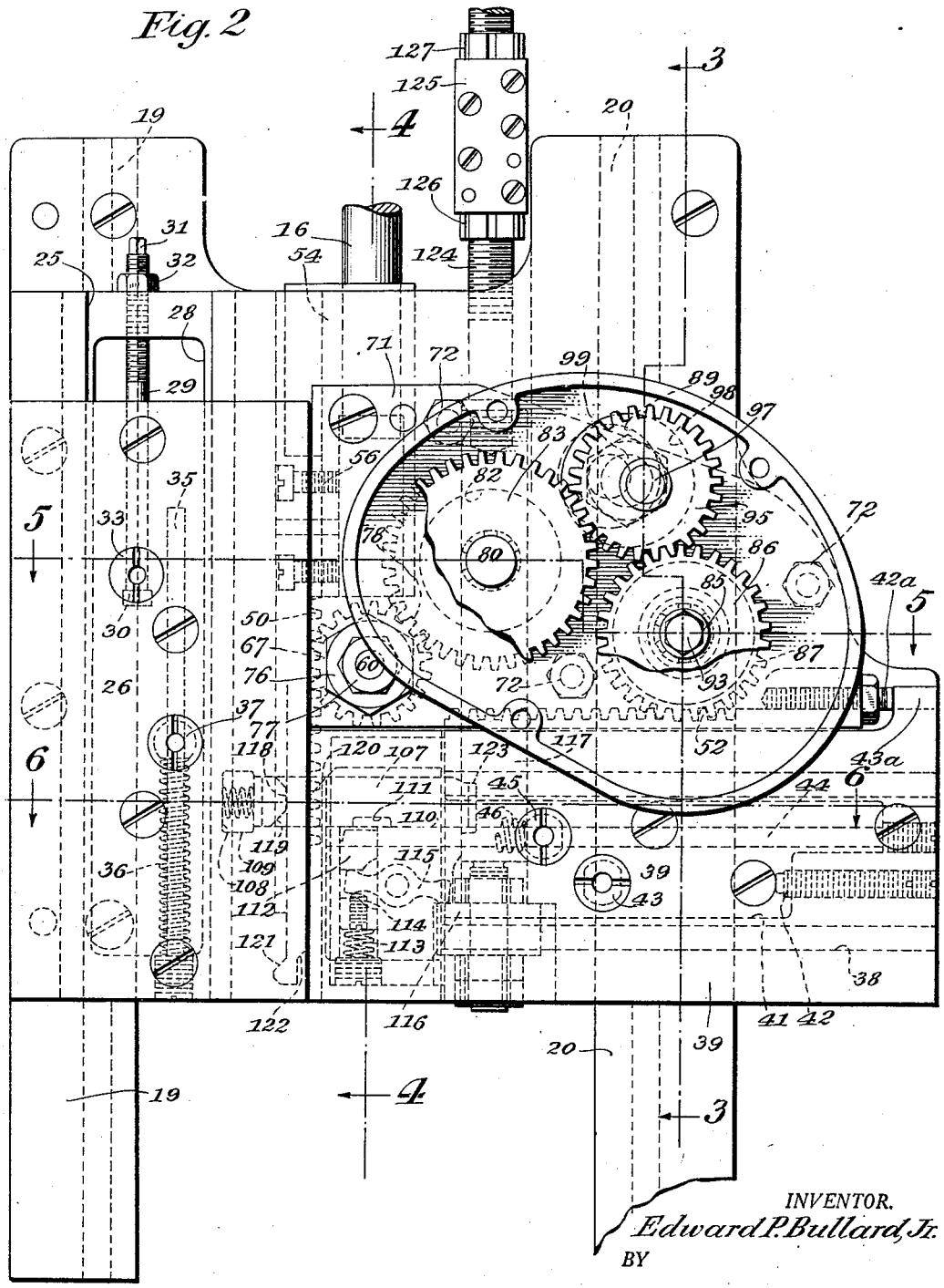

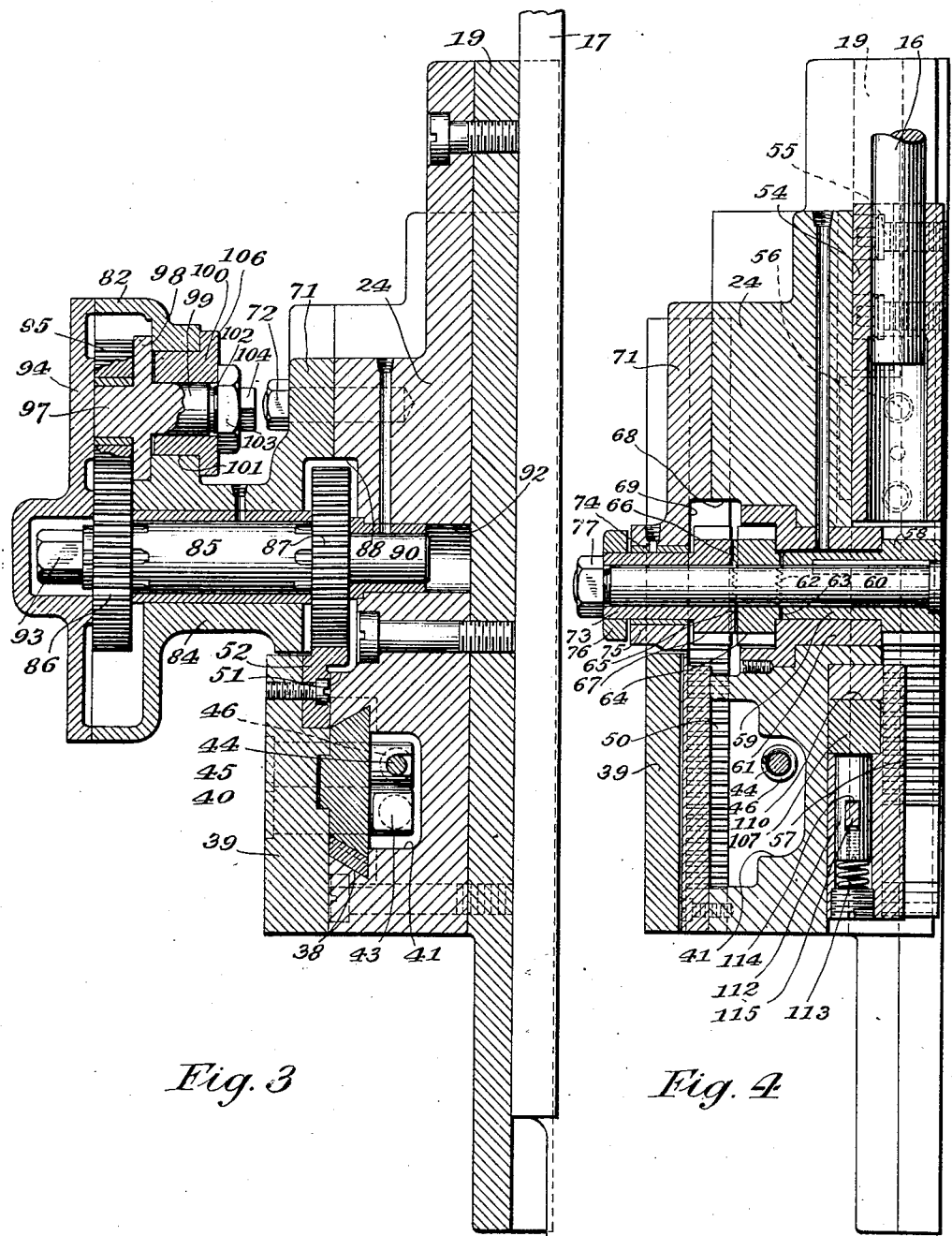

June 4, 1929.    E. P. BULLARD, JR    1,715,896
TOOL SLIDE
Filed June 28, 1926    4 Sheets-Sheet 4

INVENTOR.
Edward P. Bullard, Jr.
BY
Chamberlain & Newman
ATTORNEYS.

Patented June 4, 1929.

1,715,896

UNITED STATES PATENT OFFICE.

EDWARD P. BULLARD, JR., OF STRATFORD, CONNECTICUT, ASSIGNOR TO THE BULLARD COMPANY, OF BRIDGEPORT, CONNECTICUT, A CORPORATION OF CONNECTICUT.

TOOL SLIDE.

Application filed June 28, 1926. Serial No. 119,002.

The present invention relates to an improved tool slide mechanism for machine tools, and particularly that type of machine tool which includes a rotatable carrier, having one or more rotary work tables, and one or more tool slide mechanisms related to the work tables, and adapted to move into and out of relation to the work; and to operate automatically thereon; it being understood, however, that the invention is not limited to such use, but may be employed upon a machine having a single work table and a single tool slide mechanism to cooperate therewith.

An object of the invention is to provide tool slides respectively adapted to have independent movement imparted thereto from a single source of power, in which the application of such power will be positive, direct, and free of sliding or other parts which might set up variable working relations and forces between the tool slides, and particularly in which a given speed, force, and cutting resistance upon one of the slides will not effect a given speed, force and cutting resistance upon the other slide; and further to provide for the independent adjustment of the slide relatively to the work, to the end that the machine may be adapted to work upon pieces of different dimensions and of various shapes.

A further object is to provide means whereby the relative extent and speed of the slides may be adjusted and regulated, as desired, and in which a maximum variation as to speed, extent, force and cutting resistance may be provided upon each of the slides without effecting the operation of the other slide, or the characteristics of the work to be performed thereby. A still further object is to provide means whereby the slides may be reciprocated in either direction relative to each other, that is, one slide may be made either to move to the right or the left during the movement of the other slide in one direction, or in either direction during the movement in the other direction.

It is also an object to provide a machine which is practical, efficient, and durable, and which will insure uniform and accurate work.

With the above and other objects in view, an embodiment of the invention is shown in the accompanying drawings, and this embodiment will be hereinafter more fully described with reference thereto, and the invention will be finally pointed out in the claims.

In the drawings:—

Fig. 2 is a front elevation on an enlarged scale, of the tool slide mechanism, adapted to be mounted on the column of the machine, and operated thereby in relation to one of the work tables;

Fig. 3 is a vertical sectional view taken along the line 3—3 of Fig. 2;

Fig. 4 is a vertical sectional view taken along the line 4—4 of Fig. 2;

Similar reference characters indicate corresponding parts throughout the several figures of the drawings.

Figure 1:
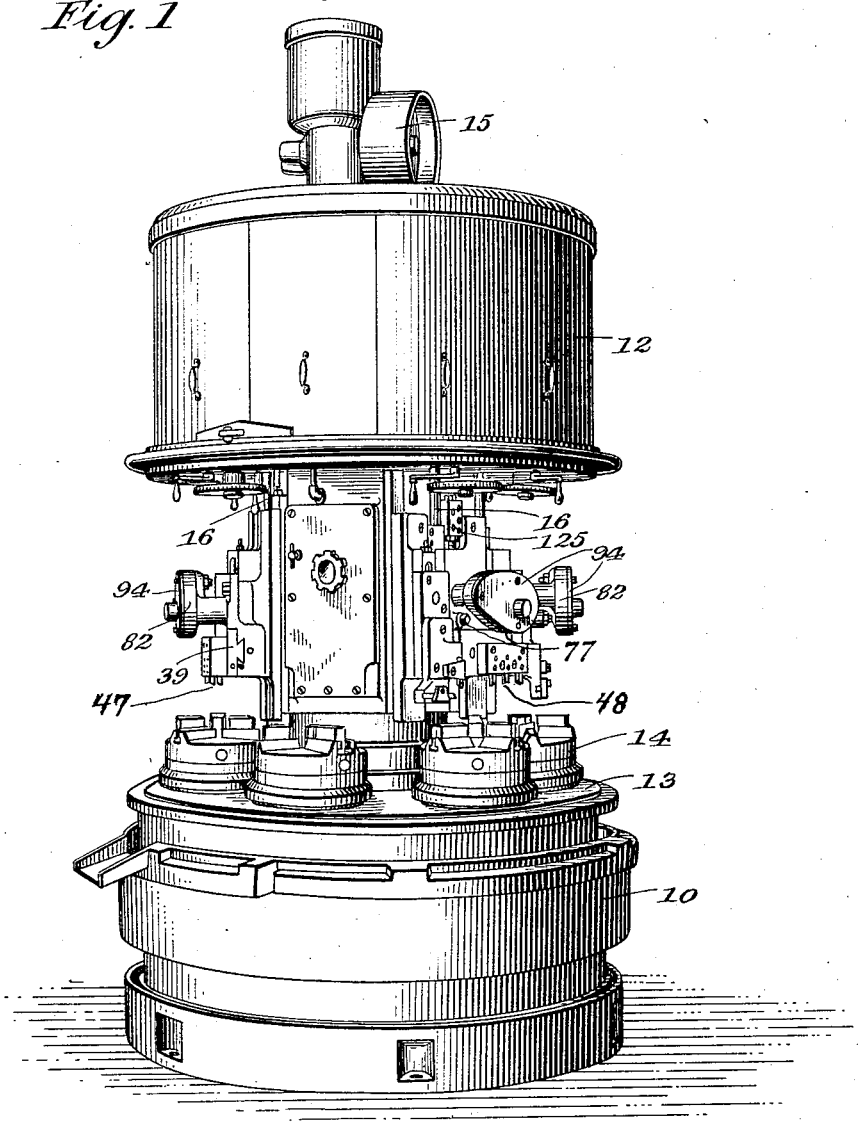
Fig. 1 is a perspective view of a machine of the type known in the trade as a "Mult-Au-Matic", in which the tool slide mechanism, according to the present embodiment of the invention, is incorporated.
Figure 5:
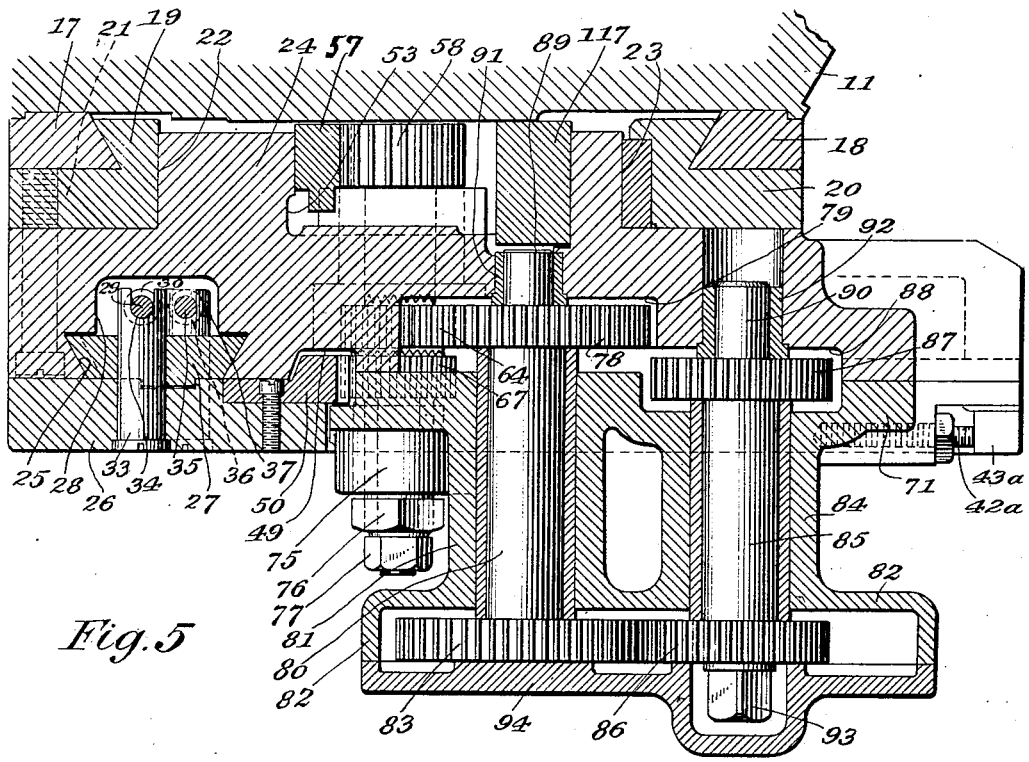
Fig. 5 is a horizontal sectional view taken along the line 5—5 of Fig. 2, parts being omitted to enable other parts to be more clearly shown.
Figure 6:
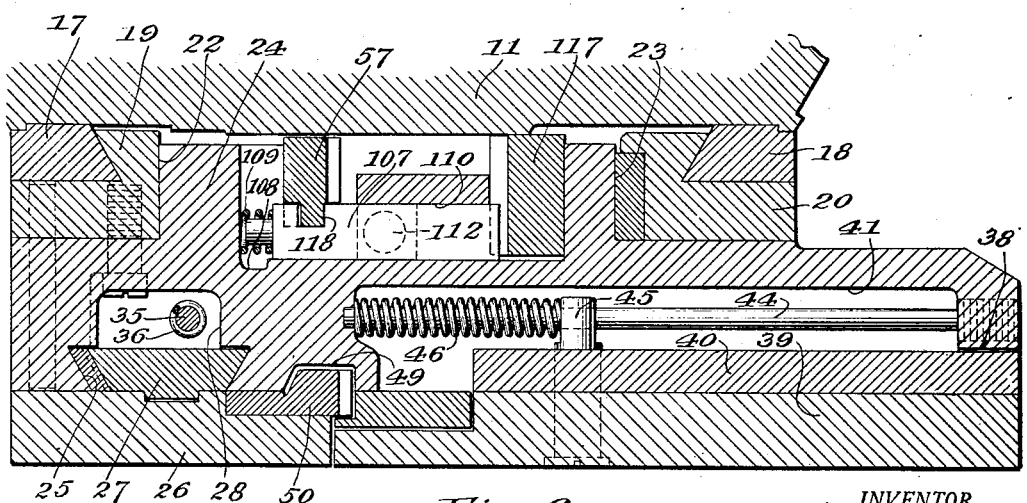
Fig. 6 is a horizontal sectional view taken along the line 6—6 of Fig. 2.

Referring particularly to Fig. 1 of the drawings, the machine tool in which the present embodiment of the invention is incorporated comprises a base 10 having a central pedestal 11, upon the upper end of which the respective tool slide feed works are mounted within a suitable housing 12, and which are adapted to operate the respective tool slide units mounted upon the pedestal at fixed stations, in relation to the work tables adapted to be intermittently moved between said stations. A turret type carrier 13, rotatably mounted upon the base and pedestal is provided with a plurality of rotary work tables 14, adapted to be rotated through suitable driving means extended downwardly through the pedestal from the pulley drive 15. The tool slide feed works are adapted to be driven from the same source, as also, the carrier indexing means, their operation being automatically timed and controlled. The forward station, as shown, is not provided with tool slides, and constitutes a loading and unloading station. Each of the tool slide feed works is provided with a vertically reciprocating feed shaft 16 adapted to operate the tool slide mounted in relation to the respective feed works.

The tool slide mechanisms are of identical construction, so that only one will be described in detail. Upon the pedestal 11 there is provided a vertical slideway of dove-tail form, formed by vertical gibs 17 and 18 having beveled inner walls and slidably engaged by angular dove-tail slide ribs 19 and 20 secured by bolts 21 in angular recesses 22 and 23 at the rearward corners of the slide carrying saddle 24. The saddle is adapted to be reciprocated vertically to a limited extent to bring the tool slides into relation with the work upon the work tables whereupon the tool slides are independently reciprocated upon the saddle to operate upon the work, as will hereinafter more fully appear.

The saddle is provided at its front face and at one side of the center with a vertical slideway 25 of dove-tail cross-section, in which the vertically reciprocating tool supporting slide, consisting of a front plate 26 and a dove-tail slide rib 27 bolted to its rear surface, is slidably supported. A vertical recess 28 is provided in the slideway 25, in the upper wall of which there is adjustably screwed a vertical threaded stop rod 29 provided at its lower end with a head 30 and at its upper end with a square wrench engagement portion 31, being fixed in its adjusted position by a locknut 32. A stud 33 is secured in the slide 26 and is provided at its inner end with a vertical slot 34 slidably engaging the rod 29 and adapted by abutment with the head 30 to limit the relative downward movement of the slide. At the lower end of the recess 28 there is secured a vertical rod 35, upon which there is mounted an elongated vertical spring 36 exerting an upward pressure on the slide by engagement with a stud 37 secured therein, and which action is adapted during the return or upward movement of the slide to prevent back-lash in the gearing, as will hereinafter more fully appear.

At the other side of the center, and also upon the front face of the saddle, there is provided a dove-tail slideway 38 in which the horizontally reciprocating tool supporting slide comprising a front plate 39 and a dove-tail slide rib 40, bolted thereto, is slidably supported. A longitudinal recess 41 is provided in the slideway 38, in one end of which there is adjustably secured a stop pin 42 adapted to be engaged by a stud 43 secured in the slide to limit the movement thereof in one direction. An adjustable stop pin 42ª screwed into the saddle is adapted to abut a lug 43ª on the slide to limit the movement in the other direction. A rod 44 is also secured longitudinally within said recess and is slidably engaged by a stud 45 secured in the slide, an elongated helical spring 46 on said rod adapted to exert a pressure on said slide to take out back-lash in the gears during return movement of the slide. As this slide is adapted for operative movement in either direction, the spring may be engaged with the rod at either side of the stud 45, the illustration showing the spring in position for operative movement of the slide to the left, and return movement to the right.

Suitable tools 47 and 48 (Fig. 1) are provided upon plates attached to the respective slides in any suitable arrangement for the particular work being done.

The inner vertical edge of the vertical tool slide 26 is provided at its rearward surface and within a vertical slot 49 of the saddle with a vertical rack 50, and the horizontal tool slide 39 is similarly provided at its upper edge at its rearward side within a horizontal slot 51 of the saddle with a horizontal rack 52, these racks adapted to mesh with gears, hereinafter referred to, and which are adapted to be driven to reciprocate the tool slides.

The saddle 24 is provided at its rear side and substantially centrally with a vertical slideway 53 in which a tubular slide rod 54 is slidably engaged and within which the lower end of the reciprocating rod 16 is secured by suitable bolts 55. To one side of the slide 54 there is secured, by screws 56, the upper end of a vertical rack 57, which meshes with a pinion 58 provided with an elongated hub 59, keyed upon a shaft 60 and journaled in a bushing 61 secured transversely within the saddle. At the forward end of the hub 59 of the gear 58 there are provided clutch teeth 62, which are engaged by clutch teeth 63 provided upon one face of a gear 64 mounted upon the shaft 60, said shaft being projected forwardly of the hub 59, and said gear 64 adapted through intermediate gearing, presently to be described, to reciprocate the horizontal slide. The other face of the gear 64 is provided with clutch teeth 65 which are engaged by clutch teeth 66 provided upon a gear 67, of corresponding diameter to the gear 64 and also mounted upon the shaft 60, and which meshes directly with the rack 50 of the vertical tool slide. These gears 64 and 67 are disposed within a suitable pocket in the saddle formed by a recess 68 upon the forward face of the saddle and a complementary recess 69 provided upon the rearward side of a cover-plate 71 secured to the saddle by suitable bolts 72. The gear 67 is provided with a forwardly extending hub 73 journaled in a bushing 74 secured within a bearing portion 75 formed upon the cover plate 71, the forward end of the hub 73 projecting with respect to the bearing 75 and being provided with a hexagonal nut 76 fixed thereon; the forward end of the shaft 60 being threaded and projecting with respect to the end of the hub 73, and provided with a nut 77 which bears upon the forward surface of said hub 73. It will thus be seen that in the tightened relation of the nut 77, as shown in Fig. 4, the clutch teeth of the gear 67 and 64 are connected with each other, and the clutch teeth of the gear 64 with the clutch teeth of the hub 59 of the gear 58, so that the whole structure is rigidly connected. By loosening the nut 77, however, the gears 67 and 64 are movable longitudinally upon the shaft to disengage the clutch teeth, sufficient clearance being provided within the recess 69 for this purpose, and the gear 67 may thus be rotated by means of a suitable wrench engaged upon its nut portion 76, independently of the gears 64 and 58, to adjust the position of the vertical slide independently of the horizontal slide and the gear 64; the gear 64 being rotatable independently of said gear 67 and the gear 58, so that the horizontal slide is also independently adjustable, as will hereinafter more fully appear.

The gear 64 meshes with and drives a gear 78 disposed in a pocket 79 formed in the saddle, and keyed upon a spindle 80 journaled in a bearing portion 81 formed upon the cover-plate 71, said portion 81 having a gear box 82 formed integrally therewith and within which a gear 83 is keyed upon the end of the spindle 80. Another bearing portion 84 is integrally formed between the cover plate 71 and the gear box 82, within which there is journaled a spindle 85 provided at its forward end with a gear 86 and provided at its rearward end with a gear 87 meshing with the rack teeth 52 of the horizontal tool slide and disposed within a suitable pocket 88 formed in the saddle. The inner ends of the shafts 80 and 85 are provided with stud portions 89 and 90 respectively which are journaled in bearing bushings 91 and 92 supported in the saddle, and at the forward end of the shaft 85 there is provided a squared portion 93 adapted to be engaged by a suitable wrench, to manually shift the horizontal tool slide in the disengaged position of the gear 64 with respect to the gear 58, as before pointed out. The gears 83 and 86, as also the gear 87 are slidably keyed upon the spindles 80 and 85, so as to be readily removable therefrom upon removal of the cover-plate 94 of the gear box, permitting substitution of gears of different ratios, with the obvious purpose of changing the relative speed of movement of the tool slides, as desired, and also for effecting the reversal of the direction of movement of the horizontal tool slide with respect to the direction of movement of the vertical tool slide. For the purpose of effecting the feed of the tool slide in one direction, an intermediate idler gear 95 is provided between the gears 83 and 86, and is rotatably mounted upon an eccentric stud 97 of a plate 98 having its shaft 99 mounted in an eccentric bushing 100 secured in an opening 101 at the rearward side of the gear box, said shaft 99 being provided with a projecting threaded portion 102 upon which a lock nut 103 is engaged, and a square wrench engaging portion 104. The bushing 100 is furthermore provided with a hexagonal flange 106 which bears upon the rearward face of the gear box and cooperates with the plate 98 to fix the relation of the stud 97 in the tightened relation of the lock-nut 103. This mounting for the gear 95 permits the same to be universally adjusted to mesh with gears of different sizes mounted upon the shafts 80 and 85, it being possible, upon loosening the lock-nut 103, to rotate the bushing 100 relatively to the gear box, and the eccentric stud 97 relatively to said bushing, so as to move said stud to any desired position of adjustment. In the other direction of operation of the horizontal tool slide, the gear 95 is disengaged from the stud 97, and the gears 83 and 86 are provided of such size as to mesh directly with each other, thereby reversing the direction of operation of the tool slide with respect to its direction when the drive is indirectly through the idler gear 95.

As before pointed out, the initial reciprocatory movement of the rod 16 imparts bodily movement to the saddle to bring the tools into and out of operative relation with the work, and thereupon the saddle remains stationary and the continued reciprocation of the rod relative to the stationary saddle imparts movement to the tool slides through the gear mechanism. For this purpose a mechanism is provided which locks the rod 16 and its rack 57 to the saddle during the initial reciprocatory movement, and releases at a predetermined point, whereupon it functions to operate the tool slide. A mechanism of this character is disclosed and claimed in U. S. Patent No. 1,382,339. As incorporated in the present invention, it comprises in part a locking pin 107 that is engaged by the rack 57, and other means for automatically operating the same at predetermined times. This locking pin is mounted in part in a pocket 108 of the saddle and in which is also provided a spring 109 that acts upon the pin to force the same outwardly.

The other end portion of the pin is operated in a pocket 110 in the saddle, said pin being provided with a notch 111 in its side portion to be engaged by the detent 112 that is slidably mounted in a vertical pocket or passage in the lower part of the pocket 110. This detent is yieldably held in engagement with the pin by means of a spring 113 and is provided with a pocket 114 in which one end of a trip-lever 115 extends, and whereby the detent is disengaged from the locking pin to free the same when the said lever engages a stop 116 provided upon an adjustable stop bar 117. The locking pin is further provided with a vertical hole 118 having specially shaped side walls which include an incline 119 upon one side and an offset incline 120 on the other. These inclines are engaged at certain times by the corresponding inclines 121, and 122 provided upon the lower end of the rack 57 so as to more positively control the position and operation of the locking pin. In this connection it will be seen that during the feeding operation the tendency of the rack is to bear upon the pin so long as the latter is locked by the detent. The rack and the tool slide operating gears meshing therewith are therefore held against independent movement and become fixed so as to be locked to the saddle. This condition insures the vertical movement of the saddle, and it will slide downward until the free end of the lever 115 engages the stop 116 which action insures the withdrawal of the detent 112 and allows the locking pin to be shoved over by the action of the spring 109 and the rack, so that its end is engaged in the pocket 123 of the stop bar 117, as shown in Fig. 2. This releasement of the lock pin arrests the further combined movement of the rack 57 and saddle, and now permits the rack to be fed independently downwardly with respect to the saddle in a manner to cause the vertical and horizontal feed of the respective tool slides.

The stop bar 117 is adjustably mounted on the stationary pedestal 11 of the machine, and is adapted to be raised and lowered to position its pocket 123 at various heights from the work table and so as to stop the downward feed at any desired point and throw in the independent tool slide feeds. This stop bar is suspended upon an adjustable screw 124, that is slidably mounted in a bar 125 secured to the face of the stationary pedestal, and provided above and below said bearing with adjusting nuts 126 and 127, through which the rod may be raised or lowered to any desired extent with respect to the pedestal. From this construction it will be understood that the lower the position of the stop bar, the longer will be the down feed and the shorter the feed of the tool slides, which are thrown in just as soon as the down movement reaches the pocket 123 and releases the rack to operate the pin 107. The return feed movement is just the reverse, the tool slides being fed reversely until the rack 57 becomes locked with the pin 107, which is withdrawn from the engagement with the pocket 123 by this action, and thereupon the rack and saddle move upwardly together.

I have illustrated and described a preferred and satisfactory embodiment of the invention, but it is obvious that changes may be made therein within the spirit and scope thereof, as defined in the appended claims.

Having thus described my invention, what I claim and desire to secure by Letters Patent is:—

1. In a tool slide mechanism, a support, a tool slide mounted to reciprocate vertically, a second tool slide mounted to reciprocate horizontally, a reciprocating rack member, a gear meshing with and adapted to be rotated by said rack member and having a spindle, a pair of gears, one for each slide, mounted on said spindle and connected to be driven thereby, and gearing between said pair of gears and the respective tool slides.

2. In a tool slide mechanism, a support, a tool slide mounted to reciprocate vertically, a second tool slide mounted to reciprocate horizontally, a reciprocating rack member, a gear meshing with and adapted to be rotated by said rack member and having a spindle, a pair of gears, one for each slide, mounted on said spindle and connected to be driven thereby, gearing between said pair of gears and the respective tool slides, and means whereby said gears may be disconnected to permit adjustment of said slides independently of said rack member and of each other.

3. In a tool slide mechanism, a support, a tool slide mounted to reciprocate vertically, a second tool slide mounted to reciprocate horizontally, a reciprocating rack member, a spindle, three gears mounted on said spindle respectively connected to said rack and said tool slides, and means for releasably connecting said gears to permit adjustment of the tool slides independently of said rack member and of each other.

4. In a tool slide mechanism, a support, a tool slide mounted to reciprocate vertically, a second tool slide mounted to reciprocate horizontally, a reciprocating rack member, a spindle, three gears mounted on said spindle, one of said gears keyed to said spindle and meshing with said rack member, said other gears being respectively connected to said tool slides, and means whereby said other gears are adapted to be rigidly connected to said first gear and disconnected to permit free rotary movement about said spindle independently of each other, and whereby said tool slides may be adjusted independently of each other and of said rack member.

5. In a tool slide mechanism, a support, a tool slide mounted to reciprocate vertically, a second tool slide mounted to reciprocate horizontally, a reciprocating rack member, a spindle, three gears mounted on said spindle respectively connected to said rack and said tool slides, said spindle having a projecting threaded end, and a binding nut engaged upon said threaded end and adapted to releasably connect said gears rigidly upon said spindle and to permit adjustment of the tool slides independently of said rack member and of each other.

6. In a tool slide mechanism, a support, a tool slide mounted to reciprocate vertically, a second tool slide mounted to reciprocate horizontally, a reciprocating rack member, a spindle, three gears mounted on said spindle respectively connected to said rack and said tool slides, clutch teeth between said gears, said gears being movable longitudinally on said spindle to release said clutch teeth to permit adjustment of the tool slides independently of said rack member and of each other, and means adapted to connect said clutch teeth whereby said gears are rigidly connected with respect to said spindle.

7. In a tool slide mechanism, a support, a tool slide mounted to reciprocate vertically, a vertical rack on said tool slide, a second tool slide mounted to reciprocate horizontally, a horizontal rack on said second tool slide, a reciprocating rack member, a spindle, and three gears mounted on said spindle respectively connected to said rack member and said racks of the respective tool slides.

8. In a tool slide mechanism, a support, a tool slide mounted to reciprocate vertically, a vertical rack on said slide, a second tool slide mounted to reciprocate horizontally, a horizontal rack on said second tool slide, a reciprocating rack member, a spindle, and three gears mounted on said spindle respectively connected to said rack member and said racks of the respective tool slides, and means for releasably connecting said gears to permit adjustment of the tool slides independently of said rack member and of each other.

9. In a tool slide mechanism, a support, a pair of tool slides mounted to reciprocate thereon, a reciprocating rack member, a pair of gears adapted to be driven thereby, one for each slide, and change gearing between one of said gears and one of said slides including a gear geared to said last mentioned gear, a gear geared to said slide, and intermediate gear between said gears, and an eccentric adjustable mounting for said intermediate gear whereby the same is bodily adjustable to mesh with different diameter gears.

10. In a tool slide mechanism, a support, a pair of tool slides mounted to reciprocate thereon, a reciprocating rack member, a pair of gears adapted to be driven thereby, one for each slide, and change gearing between one of said gears and one of said slides including a gear geared to said last mentioned gear, a gear geared to said slide, and intermediate gear between said gears, an eccentric stud supporting said intermediate gear, and an eccentric bushing supporting said eccentric stud and whereby said intermediate gear is bodily adjustable to mesh with different diameter gears.

11. In a tool slide mechanism, a support, a pair of tool slides mounted to reciprocate thereon, a vertically reciprocating rack member, a pair of gears adapted to be driven thereby, one for each slide, and change gearing between one of said gears and one of said slides including a gear directly meshing with said last mentioned gear, and gearing between said directly meshing gear and said tool slide.

12. In a tool slide mechanism, a support, tool slides mounted thereon for relative angular movement, a driven gear having a spindle, three gears, one for each slide, mounted on said spindle and connected to be driven thereby, adjusting means for the engagement and disengagement of two of said gears and gearing between said three gears and the respective tool slides.

Signed at Bridgeport in the county of Fairfield and State of Connecticut this 25th day of June A. D. 1926.

EDWARD P. BULLARD, Jr.